United States Patent [19]

Leedom et al.

[11] 3,826,877

[45] July 30, 1974

[54] INFORMATION PLAYBACK SYSTEM STYLUS

[75] Inventors: Marvin A. Leedom, Princeton, N.J.; Michael Evans Miller, Indianapolis, Ind.

[73] Assignee: RCA Corporation, New York, N.Y.

[22] Filed: Sept. 6, 1972

[21] Appl. No.: 286,657

[52] U.S. Cl.... 179/100.1 B, 179/100.41 G, 274/38, 178/6.6 A

[51] Int. Cl. .......... G11b 11/06

[58] Field of Search .......... 179/100.41 G, 100.1 B, 179/100.4 M, 100.4 R; 178/6.6 DD, 6.6 A; 274/38; 340/173 TP

[56] References Cited

UNITED STATES PATENTS

| | | | |
|---|---|---|---|
| 2,493,466 | 1/1950 | Smith | 274/38 |
| 3,569,636 | 3/1971 | Schuller | 179/100.1 B |

FOREIGN PATENTS OR APPLICATIONS

| | | | |
|---|---|---|---|
| 153,300 | 2/1922 | Great Britain | 179/100.41 G |

*Primary Examiner*—Bernard Konick
*Assistant Examiner*—Alan Faber
*Attorney, Agent, or Firm*—E. M. Whitacre; William H. Meagher

[57] ABSTRACT

A video disc playback system includes a pickup stylus which is adapted to track in a groove in a disc record. The record comprises a molded thermoplastic substrate supporting a conductive surface with a dielectric coating disposed over the conductive surface. When relative motion is established between the disc record and the pickup, the pickup stylus cooperates with the disc record to establish capacitance variations between the stylus and the record due to geometrical variations in the bottom of the groove. The stylus includes a support element having an irregular surface with a conductive element disposed on the irregular surface. The support element is shaped in a manner such that when it engages the record medium groove, an edge of the conductive element is adjacent the dielectric coating.

6 Claims, 2 Drawing Figures

PATENTED JUL 30 1974 3,826,877

INFORMATION PLAYBACK SYSTEM STYLUS

Figure 1:
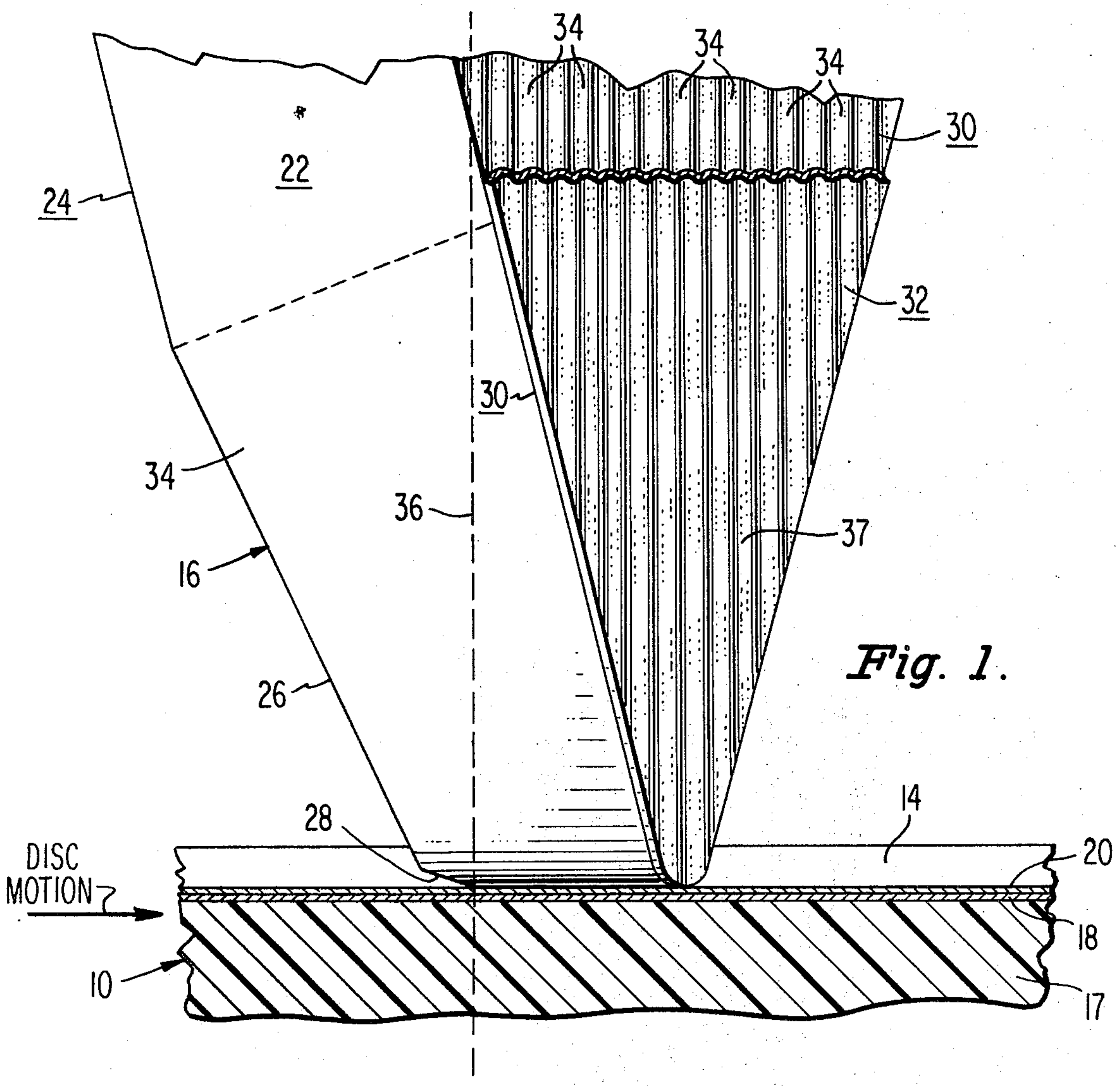

The present invention relates to an improved stylus for information playback systems, and more particularly to an improved stylus for a video disc playback system.

In certain information playback systems, video information is recorded on a disc record by means of capacitive variations. One video disc record incorporates geometric variations in the bottom of a spiral groove on a surface of the record. The disc surface includes a conductive material covered with a thin coating of dielectric material. A tracking stylus has a conductive surface which cooperates with the conductive material and dielectric coating to form a capacitance. Systems of this type are shown in a U.S. Patent application, Ser. No. 126,678, filed Mar. 22, 1971, now U.S. Pat. No. 3,783,196, for Thomas Osborne Stanley and entitled, "HIGH-DENSITY INFORMATION RECORDS AND PLAYBACK APPARATUS THEREFOR," and a U.S. Patent application, Ser. No. 126,772, filed Mar. 22, 1971, for Jon Kaufman Clemens and entitled, "INFORMATION RECORDS AND RECORDING/PLAYBACK SYSTEMS THEREFOR." Both applications are assigned to RCA Corporation.

In systems of the above-described type, as the record is rotated, the stylus riding in the disc groove cooperates with the record to establish capacitive variations due to the geometrical variations in the bottom of the spiral groove. The capacitive variations are coupled to and vary to resonant frequency of a tuned circuit which is energized by a fixed frequency oscillator. Since the fixed frequency oscillator signals are applied to the tuned circuit as the resonant frequency of the tuned circuit varies (due to the variations of the capacitance on the record) the response of the tuned circuit to the excitation signal voltage changes as a function of the record information. This provides output signals whose amplitude varies as a function of the recorded information.

The stylus structure disclosed in the Clemens application includes a support member fabricated from a hard material such as sapphire or diamond. The support element is shaped to substantially conform to the groove on the disc record surface and supports a conductive element. In one embodiment, the conductive element is disposed on a flat surface of the support element and comes into contact with the dielectric coating on the disc record. Although stylus structure of this type are very satisfactory and provide excellent performance, it is desirable to extend the usable life of the stylus by improving the wear characteristics of the structure.

In accordance with the present invention, a pickup stylus is provided which is adapted to track in the groove in a storage medium having a conductive surface with a dielectric coating disposed over the conductive surface. When relative motion is established between the storage medium and the pickup, the pickup stylus cooperates with the record to establish capacitance variations between the stylus and the medium conductive surface in accordance with recorded signal information. The stylus includes a support element having an irregular surface with a conductive element disposed on the irregular surface. The support element is shaped in a manner such that when it engages the record medium groove, an edge of the conductive element is adjacent the dielectric coating.

Figure 2:
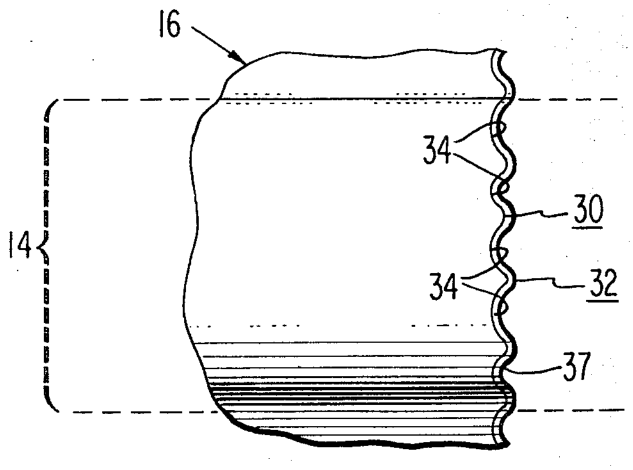

A complete understanding of the present invention may be obtained from the following detailed description of a specific embodiment thereof when taken in conjunction with the accompanying drawings, in which:

FIG. 1 is a greatly enlarged longitudinal section view of a portion of a record medium groove and a partial perspective view of a tracking stylus embodying the present invention, partially broken away to show details of the stylus construction; and FIG. 2 is a greatly enlarged fragmentary bottom view of the stylus shown in FIG. 1 with the record groove shown in phantom.

Reference is now made to the drawings. A video disc record 10 includes a groove 14. A tracking stylus 16 rides in the groove enabling it to track the groove as the video disc is rotated, similar to an audio type phonograph record player. While the entire video disc record 10 is not shown, it is similar in general appearance to a phonograph record having a spiral groove therein. Suitable groove parameters are as follows: groove pitch — 4,000 grooves per inch; groove width — 6 micron; and total groove depth — 0.5 micron. The groove walls are smoothly curved with the tip of stylus 16 comparably contoured.

The video disc record 10 includes a substrate 17 which is fabricated from a thermoplastic material such as a polychloride vinyl. The substrate 17 is molded to include the spiral groove containing the geometric variations or signal elements. The geometric variations at the bottom of the groove 14 are trenches disposed transverse to the axis of the groove and having an average depth of 0.1 micron, width (along the axis of the groove) of 0.5 micron, and spacing or land area between adjacent elements of 0.5 micron. A conductive layer 18, such as a 700 angstrom thick aluminum or gold layer, is vacuum deposited on the surface of the molded substrate 17. A dielectric layer 20, such as a 500 angstrom polystyrene coating, overlays the metallized layer 18.

The tracking stylus 16 includes a sapphire support element 22 having a front surface 24 with a beveled edge 26 leading down to a second beveled edge 28. A rear surface 30 of the sapphire support element 22 has a tantalum conductive element 32 disposed thereon to form the electrode for detecting the capacitive variations. The surface 34 between the front and rear surfaces 24 and 30, respectively, is beveled inwardly toward the front surface 24 to allow the stylus some freedom of motion in the groove 14 of the video disc 10. A corresponding beveled surface, not shown, is formed on the opposite side of the generally trapezoidal shaped stylus tip. Thus, the front surface of the stylus has a shape similar to that of conductive element 32, but somewhat smaller due to the beveled side surfaces.

When the video disc record 10 is rotated, for example, at approximately 450 RPM, the spiral groove 14 moves from left to right as indicated by the arrow in the drawing. This establishes a relative motion between the tracking stylus 16 and record 10. As the tracking stylus 16 scans along the groove 14, capacitive variations due to the signal elements in the groove occur between the conductive element 32 and the conductive layer 18. These capacitive variations are electrically detected and suitably processed as described above. The stylus structure described up to this point is similar to the structure disclosed in the Clemens application, supra.

It has been discovered that the usable life of the stylus can be greatly extended by providing an irregular rear surface 30 as is most clearly shown in FIG. 2, the bottom partial view of the stylus. The irregular surface is formed by longitudinal corrugations extending across the rear surface 30. The corrugations are randomly occurring grooves 34 which are substantially parallel to each other and to the longitudinal axis 36 of the tracking stylus 16. It is to be understood that for clarity the size of the grooves 34 have been greatly increased and are out of proportion to the actual size of the stylus. When the tracking stylus 16 engages the record groove 14, the grooves 34 are substantially perpendicular to the plane of the record and present a serpentine like edge (see FIG. 2) which engages the record groove 14. The grooves 34 are approximately 2,000 angstroms deep with approximately five grooves falling within the approximately five micron wide portion of the stylus tip in direct engagement with the record groove 14. The tantalum conductive element 32 is approximately 200 angstroms thick. The conductive element 32 covers the entire rear surface 30 of the tracking stylus 16 and is sufficiently thin such that it follows the undulations of the grooves 34 to form corresponding corrugations 37 in its trailing surface to likewise present a serpentine like edge (see FIG. 2) which engages the record groove 14.

Styli embodying the present invention have been fabricated as follows. A sapphire wafer with a smooth 1 inch diameter surface and a thickness of four milli-inches is mounted on a support plate by means of a wax compound. The exposed smooth wafer surface is then abraded on a lap by a diamond grit abrasive. The abrading is accomplished by rubbing the exposed smooth wafer surface with a 6 inch back and forth linear motion on diamond grit having an average particle size of 9 microns. The diamond grit forms randomly occurring parallel grooves in the wafer surface. The grooves have an average depth of approximately 2,000 angstroms and an average density of about one corrugation every 10,000 angstroms. It will be noted that the depth of the grooves is less than one half the wavelength of the recorded signal elements in the video disc record 10. Tantalum is vacuum sputtered onto the corrugated wafer surface to a thickness of approximately 200 angstroms. The sapphire wafer stock is then cut by a diamond saw into 60 by 25 milli-inch rectangular chips with the corrugations running parallel to the 60 milli-inch side. The chips are then rough lapped to give the general configuration of the tracking stylus structure shown in FIG. 1 and are thereafter fine lapped in a groove including a fine diamond dust to generally conform the stylus tip to the shape of the groove 14.

It has been experimentally determined that a stylus embodying the present invention has a usable life which greatly surpasses the usable life of the stylus shown in the Clemens application, supra. It is believed that the increased stylus life is due in part to maintaining a larger quantity of conductive material adjacent the dielectric layer 20 for greater periods of time. After approximately 20 hours of use, tracking styli of the type described in the Clemens application having a tantalum thickness of approximaterly 4,000 angstroms wear in a manner such that the trailing edge of the tantalum conductive element 32 adjacent the insulating layer is eroded. Specifically, the leading edge of the conductive element 32, the tantalum at the junction of the sapphire support element 24 adjacent the insulating layer 20, engages the insulating layer 20 but slopes upwardly away from the record toward the trailing edge of the conductive element 32. At the trailing edge the conductive element 32 is found to be spaced approximately 2,800 angstroms from the insulating layer 20.

It is believed that the type of erosion described above occurs because the stylus tip sinks into the polystyrene plastic insulating layer 20. During operation when relative motion is established between the tracking stylus 16 and the record groove 14, the polystyrene plastic flows up and around the trailing edge of the conductive surface 32 thereby causing erosion of the trailing edge. Once the tracking stylus has become worn and the conductive element 32 is no longer in close proximity to the insulating layer 20, the high frequency response of the stylus falls off since the electrode is spaced further from the record surface which reduces the detected capacitance variations. Moreover, the capacitance of other adjacent signal elements begins to affect the operation of the stylus.

With regard to styli embodying the present invention, it is believed that the irregular rear surface of the stylus changes the flow characteristics of the polystyrene plastic insulating layer 20 as it flows up and around the trailing edge of the conductive element 32 such that the tantalum is not eroded. It is additionally believed that the thinner conductive element 32 causes the bond strength of the tantalum to the sapphire support element to exceed the tensile strength of the tantalum. Thus, the flow of the polystyrene plastic insulating layer can only cause the erosion of particles of tantalum rather than the erosion of strips or flakes. It is believed the serpentine rear edge of the sapphire support element 32 provides protection for portions of the softer conductive element 32 disposed in the corrugations by surrounding the material on three sides. It has been experimentally determined that a stylus embodying the present invention has a usable life of about 100 hours with tracking force of 0.07 grams and a record speed of 450 RPM, at which time the sapphire support element 24 is worn to the point that the stylus no longer tracks the record groove 14.

What we claim is:

1. A pickup stylus adapted to track in a groove in a storage medium having a conductive surface and a dielectric coating over said conductive surface, and further adapted to cooperate with said storage medium to provide capacitive variations between said stylus and said storage medium conductive surface when relative motion is established between said stylus and said storage medium, said stylus comprising:

an elongated support element of insulating material having a tip of narrowed girth at one extremity of its longitudinal axis, said tip having a first tapering surface with edges which lie in a plane substantially parallel to said longitudinal axis, said tapering surface having a plurality of corrugations which extend in directions substantially parallel to said longitudinal axis and which terminate at a curved end of said tip;

a conductive coating overlying said corrugated surface, the thickness of said coating being small relative to the average depth of said corrugations such that said coating follows the undulations of said corrugations; and said coating terminating at said curved end of said support element tip to expose a coating edge surface having a curvature substantially matching the curvature of said curved end.

2. A pickup stylus as defined in claim 1 wherein said average depth of said corrugations is at least an order of magnitude smaller than the spacing between the edges of said tapering surface in the immediate vicinity of said curved end of said tip.

3. A pickup stylus as defined in claim 2 wherein the thickness of said conductive coating is an order of magnitude smaller than said average depth of said corrugations.

4. A pickup stylus adapted to track in a groove in a storage medium having a conductive surface and a dielectric coating over said conductive surface, and further adapted to cooperate with said storage medium to provide capacitive variations between said stylus and said storage medium conductive surface when relative motion is established between said stylus and said storage medium, said stylus comprising:

an elongated support element of insulating material having a tapering tip at one extremity of its longitudinal axis, said tip having a curved bottom dimensioned for groove bottom engagement, and having a rear surface with a pair of converging side edges joined by a curved bottom edge;

a conductive coating overlying said rear surface of said support element and terminating in an exposed bottom edge surface adjoining said curved bottom edge of said support element surface; and said exposed bottom edge surface of said conductive coating following the curvature of said curved bottom edge of said support element surface and having a serpentine configuration.

5. A stylus in accordance with claim 4 wherein said rear surface has a plurality of corrugations which extend in directions substantially parallel to said longitudinal axis and which terminate at said curved bottom edge; and wherein said conductive coating has a thickness which is small relative to the average depth of said corrugations.

6. A pickup stylus in accordance with claim 5 wherein said support element tip also includes an uncoated front surface, and a pair of uncoated, converging side surfaces extending between said coated rear surface and said uncoated front surface.

* * * * *